United States Patent [19]

Eibner et al.

[11] Patent Number: 4,525,197
[45] Date of Patent: Jun. 25, 1985

[54] FERTILIZER

[75] Inventors: Robert Eibner, Hilden; Hans-Heinrich Nolle, Erkrath bei Dusseldorf; Alfred Schneider, Meerbusch; Wilhelm Kohl, Nievenheim, all of Fed. Rep. of Germany

[73] Assignee: Schering Aktiengesellschaft, Berlin and Bergkamen, Fed. Rep. of Germany

[21] Appl. No.: 401,326

[22] Filed: Jul. 23, 1982

Related U.S. Application Data

[63] Continuation of Ser. No. 283,674, Jul. 15, 1981, abandoned, which is a continuation of Ser. No. 97,878, Nov. 27, 1979, abandoned, which is a continuation of Ser. No. 969,525, Dec. 14, 1978, abandoned, which is a continuation of Ser. No. 548,002, Feb. 7, 1975, abandoned.

[30] Foreign Application Priority Data

| | | |
|---|---|---|
| Feb. 13, 1974 [DE] | Fed. Rep. of Germany | 2406714 |
| Dec. 17, 1974 [DE] | Fed. Rep. of Germany | 2459585 |
| Dec. 17, 1974 [DE] | Fed. Rep. of Germany | 2459584 |
| Dec. 17, 1974 [DE] | Fed. Rep. of Germany | 2459586 |

[51] Int. Cl.$^3$ .............................................. C05G 1/00
[52] U.S. Cl. .............................................. 71/11; 71/33; 71/64.08; 71/64.09; 71/64.1
[58] Field of Search ............ 71/1, 11, 23, 25, 27, 71/33, 64.08, 64.09, 64.1, DIG. 1, 902

[56] References Cited

U.S. PATENT DOCUMENTS

| | | | |
|---|---|---|---|
| 2,971,292 | 2/1961 | Malecki | 71/1 |
| 3,096,170 | 7/1963 | Newson, Jr. | 71/1 X |

FOREIGN PATENT DOCUMENTS 1642122  7/1970  Fed. Rep. of Germany ... 71/DIG. 1

OTHER PUBLICATIONS

The Condensed Chemical Dictionary, 8th Ed., Van Nostrand, pp. 175, 327, 516, 809, 817.

*Primary Examiner*—Ferris H. Lander
*Attorney, Agent, or Firm*—Michael J. Striker

[57] ABSTRACT

A fertilizer in the form of a concentrated dispersion of undissolved nutrient materials in an aqueous medium containing said same and/or other nutrient materials in solution, the dispersion also containing as dispersants, magnesium-aluminum silicate and at least one additional dispersant selected from the group consisting of sorbitol, polyvinyl alcohol, caseinate, and soluble starch hydrolysates whereby the formation of large crystals of said nutrients and phase separation is avoided over prolonged periods of time of up to three years. The invention also includes the method for making such fertilizers.

6 Claims, No Drawings

FERTILIZER

This is a continuation of application Ser. No. 283,674, filed July 15, 1981 which is a continuation of application Ser. No. 97,878 filed on Nov. 27, 1979, which is a continuation of application Ser. No. 969,525 filed on Dec. 14, 1978 which is a continuation of Ser. No. 548,002 filed Feb. 7, 1975, all now abandoned.

The invention relates to a fertilizer in the form of a dispersion of undissolved nutrient materials in an aqueous solution of nutrient materials, the dispersion containing a hydrated magnesium aluminum silicate and an additional dispersing agent.

Such fertilizers are referred to as suspension fertilizers. The undissolved nutrient materials in such suspension fertilizers are maintained in suspension in the form of finely divided solids by dispersing agents. Suitable dispersing agents are hydrated magnesium aluminum silicates, such as attapulgite and bentonite, and furthermore organic compounds such as polysaccharides (Ullmanns Encyklopädie der technischen Chemie, third edition, supplementary volume (1970) pages 359–540).

The German Offenlegungsschrift No. 1,667,798 describes carboxymethylcellulose as an organic colloidal suspension stabilizer for a suspension fertilizer containing no silicate. A disadvantage of such suspension fertilizers is that upon dilution with water, gel particles are formed which can be dissolved only very slowly.

U.S. Pat. Nos. 3,148,970, 3,160,495 and 3,234,004 described suspension fertilizers which in addition to attapulgite may contain tetrasodium pyrophosphate as a dispersing agent. This pyrophosphate has the formula $Na_4P_2O_7$.

U.S. Pat. No. 3,579,321 describes that spent phosphoric acid which has been used in metallurgy and contains metallic impurities can be used for making suspension fertilizers by adding lignin sulfonates and clay. The lignin sulfonates prevent the formation of a gelatinous precipitate which would otherwise be produced when adding ammonium hydroxide to the spent acid.

The known suspension fertilizers have a narrowly restricted storage stability, for the crystal-containing nutrient material suspensions are subject to comparatively rapid sedimentation of the solids, so that in some cases even after storage for only a few hours considerable differences in concentration can be detected within the individual liquid ranges. When storing the known suspension fertilizers this sedimentation must be prevented, e.g. by agitating the crystal suspensions at regular intervals or by rehomogenizing them by a small air stream. The crystal suspensions stabilized with magnesium aluminum silicate show in addition a continuous coarsening of the crystalline content, and this phenomenon is greatly accelerated by fluctuations of the storage temperature. This is the case in particular if the suspended nutrient materials consist only of readily soluble salts. When the temperature rises part of these salts passes from the suspended phase to the dissolved phase, and when the fertilizer is subsequently cooled large crystals precipitate.

Netherlands Patent Application No. 6,902,342 laid open to public inspection describes an aqueous suspension fertilizer which comprises NPK (nitrogen, phosphorus, potassium) plant nutrient materials, water-soluble polyphosphate and a water-soluble magnesium compound. This fertilizer may additionally contain attapulgite or bentonite. This fertilizer shows improved sedimentation behaviour and retarded formation of large crystals. However, the suspensions prepared by the method described have to be used comparatively quickly, i.e. after storage for a few months, similarly to the other suspensions just described.

It is an object of the present invention to provide a suspension fertilizer which in addition to an increased storage stability without phase separation, exhibits a still further reduced crystal growth so that after prolonged storage (for example for 2 to 3 years) a satisfactory suspension can be obtained by reblending. The advantage over the known suspension fertilizers primarily consists in that the duration of storage stability is considerable increased without the necessity of continuous or regular mechanical blending.

According to the invention this object is achieved by a suspension fertilizer of the type described which is characterized in that it contains as an additional dispersing agent at least one material selected from the group comprising sorbitol, polyvinyl alcohol, caseinate and soluble starch hydrolysates.

A preferred embodiment of the suspension fertilizer according to the invention is characterized in that it also contains sodium polyphosphate.

A further advantageous embodiment of the suspension fertilizer according to the invention is characterized in that it also contains lignin sulfonic acids or the salts thereof.

A modified embodiment of the suspension fertilizer of the invention is characterized in that the fertilizer contains lignin sulfonic acids or salts thereof and sodium polyphosphate (instead of sorbitol, polyvinyl alcohol, caseinates and/or soluble starch hydrolysates).

The dispersing agents are used in concentrations from 0.1% to 14% by weight calculated with respect to the finished fertilizer. The following specific concentrations also are calculated with respect to the finished product.

Sorbitol can be used, for example, in the form of the commercially available products Karion in the form of sand like grains, Karion F liquid, Karion 83 from Merck AG., Darmstadt. Preferably amounts of 0.1% to 5% by weight are used.

As the polyvinyl alcohol (PVA) use may be made, for example, of the Organal types of Maizena Industrieprodukte GmbH., types 9700S and 9850S, which have a degree of hydrolysis of 98% to 99% by weight. Preferably amounts of 0.1% to 5% by weight are used.

Suitable salts of lignin sulfonic acid are, for example, the Totanin types of A/S Toten Cellulosefabrik Nygard St, Norway: Totanin, Totanin F, Totanin NA, Totanin F NA, Totanin MG, Totanin G MG. These compositions contain, in addition to the various salts of the lignin sulfonic acid ($NH_4+$, Ca, Mg, Na) the hexoses: mannose, galactose, glucose, and the pentoses xylose and arabinose. Use may also be made of modified products in which sugar amines have formed by heating. The products used in the experiments described hereinafter were entirely soluble in water and had about the following mean chemical data:

weight by volume: 0.7 kg/l
tanin content: 52.0%
lignin sulfonates total amount: 70.0%
   high molecular weight: 43.0%
   low molecular weight: 28.0%
reducing substance (calculated as glucose): 20.0%
uronic acids: 3.7% methoxyl (OCH₃): 9.3%

The amounts used preferably are 0.1% to 8% by weight.

Preferred caseinates are alkaline metal and alkaline earth metal caseinates, in particular in amounts of 0.1% to 5% by weight.

The soluble starch hydrolysate used preferably is glucose syrup, in particular a mixture of simple and multiple sugars as such is used to prevent crystallization of saccharose in fondants. It is true that such soluble starch hydrolysates contain among other constituents polysaccharides, however, (in contradistinction to carboxymethylcellulose) they do not promote gelation. Use may be made, for example, of glucose syrup of the Deutsche Maizena-Werke GmbH., Hamburg, in particular the types 43 and 45. The content of reducing sugar is about 40%. The sugars are composed of:

D-glucose: about 18.0% disaccharides (maltose): about 14.0% polysaccharides and saccharides of high molecular weight: about 68.0% specific weight (20° C.): 1.4–1.5 refractive index (20° C.): 1.4915–1.5049 pH: 4.8–5.2

The amounts used preferably are 0.1% to 8% by weight.

It should be mentioned that Japanese Patent Application No. 15,980/67 describes a liquid suspension fertilizer of increased suspension stability which contains, in addition to bentonite, lixiviated molasses or glucose. However, the feature of the invention is not obtainable by means of glucose, for in comparative experiments it was found that although the addition of glucose reduces the settling rate of suspensions, it does not inhibit crystal growth. Hence glucose cannot be compared to glucose syrup neither with respect to its composition nor with respect to its effect.

A suitable sodium polyphosphate is, for example, a white hygroscopic powder consisting of sodium polyphosphate of medium chain length. Such polyphosphates are distinguished both in chemical composition and in effect from the aforementioned diphosphate which is known as a dispersing agent for suspension fertilizers and is a low-condensation phosphate. A suitable sodium polyphosphate is, for example, Calgon N of Benckiser-Knapsack GmbH, Ludwigshafen/Rhein, the analysis data of which are:

total content of P₂O₅: about 60% pH of a 1% solution: 7.2–7.5

Preferably about 0.1% to 6% by weight is used.

The suspension fertilizer according to the invention can be formulated both as a mineral single-nutrient fertilizer and as a mineral multinutrient fertilizer. As constituents of the mixture both water-soluble and non-water-soluble nutrient salts may be used. The fact that entirely soluble nutrient salts can be used within the scope of the invention is remarkable in that, as has been mentioned hereinbefore, suspensions of these salts are more liable to "salt out" owing to temperature fluctuations than the suspensions of poorly soluble mineral salts (when the temperature is increased the initially suspended entirely soluble mineral salts are dissolved; upon subsequent cooling they separate in the form of crystals). This means that the dispersing agent in the suspension fertilizer according to the invention produces inhibition or retardation of crystallization. In addition it prevents any crystals which still may be formed, for example under extreme storage conditions, from growing excessively. In detail the suspension fertilizers according to the invention may have the following contents of nutrient materials:

A. Mineral one-nutrient fertilizers (a) Nitrogen fertilizers containing from 1% to 40% of nitrogen in the form of ammonium, nitrate or amide.

(b) Phosphate fertilizer having a content of $P_2O_3$ of 1%–50%.

(c) Potassium fertilizer having a content of $K_2O$ of 1%–40%.

B. Mineral multinutrient fertilizers (a) NPK fertilizers having contents of N of 1%–30%, contents of $P_2O_5$ of 1%–60% and contents of $K_2O$ of 1%–30%.

(b) NP fertilizers having contents of N of 1%–30% and contents of $P_2O_5$ of 1%–50%.

(c) NK fertilizers having contents of N of 1%–40% and contents of $K_2O$ of 1%–40%.

(d) PK fertilizers having contents of $P_2O_5$ of 1%–45% and contents of $K_2O$ of 1%–40%.

The aforementioned fertilizers are made either by suspending the corresponding inorganic salts together with urea or by preparing the said salts by neutralization in the presence of urea and subsequent cooling of the solution with crystallization.

The fertilizers according to the invention may have trace elements added to them in arbitrary concentrations either in the form of salts or as chelates. Fully chelated trace elements are preferred, for example a mixture of trace element sulfates, (Co, Mo, Zn, Cu, B, Mn, Fe), chelating agents (ethylene diametetraacetic acid, nitrilotriacetic acid) and possible secondary plant nutrients (vitamins, hormones). In the formulations listed hereinafter such a chelate mixture will be referred to as "chelated trace elements".

The fertilizer according to the invention may further contain pesticides, in particular herbicides. Liquid pesticidal substances which are not miscible with water may be incorporated in the fertilizer suspensions by the use of special emulsifying agents. Water-soluble pesticidal active substances are actually dissolved in the liquid phase of such a suspension. Non-water-soluble solid active substances can be incorporated in the dispersed part of the suspension by using special dispersing agents. Such results are obtainable in particular when using the following active substances:

parathion—O,O-diethyl-O-(4-nitrophenyl)-monothiophosphate carbaryl—N-methyl-1-naphthyl-carbamate captan—N-(trichloromethylthio)-4-cyclohexene-1,2-dicarboximide or N-(trichloromethylthio)tetrahydrophthalimide dicamba—3,6-dichloro-2-methoxy-benzoic acid or 3,6-dichloro-o-anisic acid 2,4-D—2,4-dichlorophenoxyacetic acid (butyl, isopropyl or 2-ethylhexyl ester)

For the purpose of mixing in the form of an emulsion the emulsifying agents HJP 1, HJP 2 and Emcol AC 61/17 were used in concentrations of 1%–5% (specific weight 1,035; pH of the 3% dispersion 5.7–6.0, water content 11%). As an adjuvant for suspension Drysperse 406 and Drysperse 407 were used in concentrations of 1%–8%. These adjuvants are manufactured by Witko-Chemical, NEW YORK. The use of these adjuvants enables mixtures of fertilizers and pesticides to be made which contain from 1% to 50% of pesticidal active substances.

For homogenizing the fertilizer constituents a device may be used as manufactured by Hoelscher-Technik, Herne/Westfalia, under the trade name Gorator R. This device was developed from a centrifugal pump, however, the rotor is an inclined disc instead of a normal pump impeller. When the disc rotates, superposed flow movements are produced in the pump which effect thorough mixing, causing pulverizing of the crystals and delivery of the fertilizer.

The suspension fertilizers according to the invention are advantageously distinguished from the known suspension fertilizers in that they can be resuspended even after prolonged storage and are entirely soluble in water with the exception of a small insoluble residue of formation adjuvants. Storage stability, resuspendibility and solubility last for more than one year. Hence the suspension fertilizers according to the invention are fully comparable to liquid fertilizers which are marketed all over the world and according to their nature are real salt solutions. Whereas the known suspension fertilizers can only be used undiluted, the suspension fertilizers according to the invention can also be used as concentrates which before use can simply be diluted with water so that the nutrient materials are completely and really dissolved. This provides the further advantage that the suspension fertilizers according to the invention can also be used as leaf fertilizers. As is known, leaf fertilizers provide rapid effects only if all the nutrient materials are really dissolved.

For use as leaf fertilizers it also is advantageous that some of the suspension fertilizers according to the invention contain glucose. Glucose is also absorbed by the leaf surfaces and is utilized by the plant.

The following examples are given to illustrate more fully the practice of this invention.

EXAMPLE 1

205.0 kg of diammonium phosphate are produced by neutralizing phosphoric acid with ammonia in the presence of 205.0 kg of water, 30.0 kg of potassium sulfate, 85.0 kg of potassium nitrate and 9.0 kg of potassium chloride are added, in this sequence, to the hot salt solution, after which the mixture was homogenized by means of a worm conveyor, Gorator. Then 102.0 kg of urea are added, after which homogenization is continued. A refrigerating device in the Gorator keeps the suspension being produced at room temperature. The wet grinding operation by continuous circulation is continued until the desired fineness is obtained. Subsequently 15 kg of Mg-Al silicate and 35 kg of glucose syrup are added. Finally 80 kg of phosphoric acid are added. The resulting crystal suspension is circulated until it is completely homogenized.

EXAMPLE 2

102.0 kg of diammonium phosphate are produced by neutralizing phosphoric acid with ammonia in the presence of 205.0 kg of water. 30.0 kg of potassium sulfate, 85.0 kg of potassium nitrate and 9.0 kg of potassium chloride are added, in this sequence, to the hot salt solution, and the mixture is then homogenized by means of a worm conveyor Gorator. Subsequently 102.0 kg of urea are added, after which homogenization is continued. A refrigerating device in the Gorator maintains the suspension being produced at room temperature. The wet grinding operation by continuous circulation is continued until the desired fineness is obtained. Subsequently 8.0 kg of Mg-Al silicate, 7,5 kg of caseinate and 7.5 kg of glucose syrup are added. 40.0 kg of phosphoric acid and subsequently 100.0 kg of Emcol HJP 1 are added and finally 300.0 kg of ethylparathion is intimately admixed therewith. The resulting mixture is circulated until it is completely homogenized.

EXAMPLE 3

205.0 kg of diammonium phosphate are produced by neutralizing phosphoric acid with ammonia in the presence of 198.0 kg of water. 60 kg of potassium sulfate, 170.0 kg of potassium nitrate and 19.0 kg potassium chloride are added, in this sequence, to the hot salt solution, after which the mixture is homogenized, by means of a worm conveyor Gorator. Then 203.0 kg of urea are added, after which homogenization is continued. A refrigerating device in the Gorator maintains the suspension being produced at room temperature. The wet grinding process by continuous circulation is continued until the desired degree of fineness is reached. Then 15 kg of Mg-Al silicate, 35 kg of glucose syrup and 15 kg of Na polyphosphate are added. Finally 80 kg phosphoric acid are admixed therewith. The resulting crystal suspension is circulated until it is completely homogenized.

EXAMPLE 4

205.0 kg of diammonium phosphate are produced by neutralizing phosphoric acid with ammonia in the presence of 180.0 kg of water. 60.0 kg of potassium sulfate, 170.0 kg of potassium nitrate and 19.0 kg of potassium chloride are added, in this sequence, to the hot salt solution, after which the mixture was homogenized by means of a worm conveyor Gorator. Then 203.0 kg of urea are added, after which homogenization is continued. A refrigerating device in the Gorator maintains the suspension being produced at room temperature. The wet grinding process by continuous circulation is continued until the desired degree of finess is reached. Then 15.0 kg of Mg-Al silicate, 30.0 kg of glucose syrup and 30.0 kg of lignin sulfonic acid are added. Finally 80.0 kg of phosphoric acid are admixed therewith. The resulting crystal suspension is circulated until it is completely homogenized.

EXAMPLE 5

10.20 kg of diammonium phosphate are produced by neutralizing phosphoric acid with ammonia in the presence of 205.0 kg of water. 30.0 kg of potassium sulfate, 85.0 kg of potassium nitrate and 9.0 kg of potassium chloride were added, in this sequence, to the hot salt solution, after which the mixture was homogenized by means of a worm conveyor Gorator. Then 102.0 kg of urea are added and homogenization is continued. A refrigerating device in the Gorator maintains the suspension being produced at room temperature. The wet grinding process by continuous circulation is continued until the desired degree of fineness is reached. Then 8.0 kg of Mg-Al silicate, 7.5 kg of lignin sulfonic acid and 7.5 kg of glucose syrup are added. After the addition of 40.0 kg of phosphoric acid; 100.0 kg of Emcol HJP 1 are added and finally 300.0 kg of ethyl parathion are intensively admixed therewith. The resulting mixture is circulated until it is completely homogenized.

According to the above basic examples the following formulations, given by way of example, may be made:

1. Formulations including sorbitol

(a) NPK = 16/16/12
| | |
|---|---:|
| chelated trace elements, see above | 8.0 kg |
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| sorbitol | 25.0 kg |
| phosphoric acid | 80.0 kg |
| water | 215.0 kg |
| | 1000.0 kg |

(b) NPK = 10/-/20
| | |
|---|---:|
| chelated trace elements, see above | 8.0 kg |
| caustic potash 45% | 140.0 kg |
| potassium sulfate | 299.0 kg |
| ammonium nitrate | 26.0 kg |
| urea | 201.0 kg |
| ammonium sulfate | 5.0 kg |
| Mg—Al silicate | 15.0 kg |
| sorbitol | 25.0 kg |
| water | 281.0 kg |
| | 1000.0 kg |

(c) NPK = 25/6/10
| | |
|---|---:|
| chelated trace elements, see above | 8.0 kg |
| diammonium phosphate | 77.0 kg |
| phosphoric acid 85% | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al—silicate | 15.0 kg |
| sorbitol | 25.0 kg |
| water | 104.0 kg |
| | 1000.0 kg |

(d) NPK = 20/-/15
| | |
|---|---:|
| chelated trace elements, see above | 8.0 kg |
| ammonium nitrate | 87.0 kg |
| potassium nitrate | 327.0 kg |
| urea | 220.0 kg |
| Mg—Al silicate | 15.0 kg |
| sorbitol | 25.0 kg |
| water | 316.0 kg |
| | 1000.0 kg |

(e) NPK MgCa = 10/-/-/2/15
| | |
|---|---:|
| chelated trace elements, see above | 8.0 kg |
| calcium nitrate | 556.0 kg |
| urea | 31.0 kg |
| magnesium chloride | 101.0 kg |
| Mg—Al silicate | 15.0 kg |
| sorbitol | 25.0 kg |
| water | 264.0 kg |
| | 1000.0 kg |

2. Formulations containing polyvinyl alcohol

(a) NPK = 16/16/12
| | |
|---|---:|
| chelated trace elements, see above | 8.0 kg |
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| polyvinyl alcohol | 30.0 kg |
| phosphoric acid 85% | 80.0 kg |
| water | 210.0 kg |
| | 1000.0 kg |

(b) NPK = 10/-/20
| | |
|---|---:|
| chelated trace elements, see above | 8.0 kg |
| caustic potash 45% | 140.0 kg |
| potassium sulfate | 299.0 kg |
| ammonium nitrate | 26.0 kg |
| urea | 201.0 kg |
| ammonium sulfate | 5.0 kg |
| Mg—Al silicate | 15.0 kg |
| polyvinyl alcohol | 30.0 kg |
| water | 276.0 kg |
| | 1000.0 kg |

(c) NPK = 25/6/10
| | |
|---|---:|
| chelated trace elements, see above | 8.0 kg |
| diammonium phosphate | 77.0 kg |
| phosphoric acid | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al silicate | 15.0 kg |
| polyvinyl alcohol | 30.0 kg |
| water | 9.0 kg |
| | 1000.0 kg |

(d) NPK = 20/-/15
| | |
|---|---:|
| chelated trace elements, see above | 8.0 kg |
| ammonium nitrate | 87.0 kg |
| potassium nitrate | 327.0 kg |
| urea | 222.0 kg |
| Mg—Al silicate | 15.0 kg |
| polyvinyl alcohol | 30.0 kg |
| water | 311.0 kg |
| | 1000.0 kg |

(e) NPK MgCa = 10/-/-/2/15
| | |
|---|---:|
| chelated trace elements, see above | 8.0 kg |
| calcium nitrate | 556.0 kg |
| urea | 31.0 kg |
| magnesium chloride | 101.0 kg |
| Mg—Al silicate | 15.0 kg |
| polyvinyl alcohol | 30.0 kg |
| water | 259.0 kg |
| | 1000.0 kg |

3. Formulations including caseinates

(a) NPK = 16/16/12
| | |
|---|---:|
| chelated trace elements, see above | 8.0 kg |
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| caseinate | 30.0 kg |
| phosphoric acid 85% | 80.0 kg |
| water | 210.0 kg |
| | 1000.0 kg |

(b) NPK = 10/-/20
| | |
|---|---:|
| chelated trace elements, see above | 8.0 kg |
| caustic potash 45% | 140.0 kg |
| potassium sulfate | 299.0 kg |
| ammonium nitrate | 26.0 kg |
| urea | 201.0 kg |
| ammonium sulfate | 5.0 kg |
| Mg—Al silicate | 15.0 kg |
| caseinate | 30.0 kg |
| water | 276.0 kg |
| | 1000.0 kg |

(c) NPK = 25/6/10
| | |
|---|---:|
| chelated trace elements, see above | 8.0 kg |
| diammonium phosphate | 77.0 kg |
| phosphoric acid 85% | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al silicate | 15.0 kg |
| caseinate | 30.0 kg |
| water | 99.0 kg |
| | 1000.0 kg |

(d) NPK = 20/-/15
| | |
|---|---:|
| chelated trace elements, see above | 8.0 kg |
| ammonium nitrate | 87.0 kg |
| potassium nitrate | 327.0 kg |
| urea | 222.0 kg |
| Mg—Al silicate | 15.0 kg |
| caseinate | 30.0 kg |
| water | 311.0 kg |
| | 1000.0 kg |

(e) NPK MgCa = 10/-/-/2/15

| | |
|---|---:|
| chelated trace elements, see above | 8.0 kg |
| calcium nitrate | 556.0 kg |
| urea | 31.0 kg |
| magnesium chloride | 101.0 kg |
| Mg—Al silicate | 15.0 kg |
| caseinate | 30.0 kg |
| water | 259.0 kg |
| | 1000.0 kg |

4. Formulations containing glucose syrup

(a) NPK = 16/16/12

| | |
|---|---:|
| chelated trace elements, see above | 8.0 kg |
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| glucose syrup | 35.0 kg |
| phoshoric acid 85% | 80.0 kg |
| water | 205.0 kg |
| | 1000.0 kg |

(b) NPK = 10/-/20

| | |
|---|---:|
| chelated trace elements, see above | 8.0 kg |
| caustic potash 45% | 140.0 kg |
| ammonium nitrate | 26.0 kg |
| urea | 201.0 kg |
| ammonium sulfate | 5.0 kg |
| Mg—Al silicate | 15.0 kg |
| glucose syrup | 35.0 kg |
| water | 570.0 kg |
| | 1000.0 kg |

(c) NPK = 25/6/10

| | |
|---|---:|
| chelated trace elements, see above | 8.0 kg |
| diammonium phosphate | 77.0 kg |
| phosphoric acid 85% | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al silicate | 15.0 kg |
| glucose syrup | 35.0 kg |
| water | 94.0 kg |
| | 1000.0 kg |

(d) NPK = 20/-/15

| | |
|---|---:|
| chelated trace elements, see above | 8.0 kg |
| ammonium nitrate | 87.0 kg |
| potassium nitrate | 327.0 kg |
| urea | 222.0 kg |
| Mg—Al silicate | 15.0 kg |
| glucose syrup | 35.0 kg |
| water | 306.0 kg |
| | 1000.0 kg |

(e) NPK MgCa = 10/-/-/2/15

| | |
|---|---:|
| chelated trace elements, see above | 8.0 kg |
| calcium nitrate | 556.0 kg |
| urea | 31.0 kg |
| magnesium chloride | 101.0 kg |
| Mg—Al silicate | 15.0 kg |
| glucose syrup | 35.0 kg |
| water | 254.0 kg |
| | 1000.0 kg |

5. Formulations containing caseinate and glucose syrup

(a₁) NPK = 16/16/12

| | |
|---|---:|
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| glucose syrup | 35.0 kg |
| caseinate | 15.0 kg |
| phosphoric acid 85% | 80.0 kg |
| water | 198.0 kg |
| | 1000.0 kg |

(a₂) NPK = 16/16/12

| | |
|---|---:|
| chelated trace elements, see above | 8.0 kg |
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| glucose syrup | 35.0 kg |
| caseinate | 15.0 kg |
| phosphoric acid 85% | 80.0 kg |
| Water | 190.0 kg |
| | 1000.0 kg |

(b₁) NPK = 10/-/20

| | |
|---|---:|
| caustic potash 45% | 140.0 kg |
| potassium sulfate | 299.0 kg |
| ammonium nitrate | 26.0 kg |
| urea | 201.0 kg |
| ammonium sulfate | 5.0 kg |
| Mg—Al silicate | 15.0 kg |
| glucose syrup | 35.0 kg |
| caseinate | 15.0 kg |
| water | 264.0 kg |
| | 1000.0 kg |

(b₂) NPK = 10/-/20

| | |
|---|---:|
| chelated trace elements, see above | 8.0 kg |
| caustic potash 45% | 140.0 kg |
| potassium sulfate | 299.0 kg |
| ammonium nitrate | 26.0 kg |
| urea | 201.0 kg |
| ammonium sulfate | 5.0 kg |
| Mg—Al silicate | 15.0 kg |
| glucose syrup | 35.0 kg |
| caseinate | 15.0 kg |
| water | 256.0 kg |
| | 1000.0 kg |

(c₁) NPK = 25/6/10

| | |
|---|---:|
| diammonium phosphate | 77.0 kg |
| phosphoric acid 85% | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al silicate | 15.0 kg |
| glucose syrup | 35.0 kg |
| caseinate | 15.0 kg |
| water | 87.0 kg |
| | 1000.0 kg |

(c₂) NPK 32 25/6/10

| | |
|---|---:|
| chelated trace elements, see above | 8.0 kg |
| diammonium phosphate | 77.0 kg |
| phosphoric acid 85% | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al silicate | 15.0 kg |
| glucose syrup | 35.0 kg |
| caseinate | 15.0 kg |
| water | 79.0 kg |
| | 1000.0 kg |

(d₁) NPK = 20/-/15

| | |
|---|---:|
| ammonium nitrate | 87.0 kg |
| potassium nitrate | 327.0 kg |
| urea | 222.0 kg |
| Mg—Al silicate | 15.0 kg |
| glucose syrup | 35.0 kg |
| caseinate | 15.0 kg |
| water | 299.0 kg |
| | 1000.0 kg |

(d₂) NPK = 20/-/15

| | |
|---|---:|
| chelated trace elements, see above | 8.0 kg |
| ammonium nitrate | 87.0 kg |
| potassium nitrate | 327.0 kg |
| urea | 222.0 kg |
| Mg—Al silicate | 15.0 kg |
| glucose syrup | 35.0 kg |
| caseinate | 15.0 kg |
| water | 291.0 kg |

-continued

| (e₁) NPK MgCa = 10/-/-/2/15 | 1000.0 kg |
|---|---|
| calcium nitrate | 556.0 kg |
| urea | 31.0 kg |
| magnesium chloride | 101.0 kg |
| Mg—Al silicate | 15.0 kg |
| glucose syrup | 35.0 kg |
| caseinate | 15.0 kg |
| water | 247.0 kg |
| | 1000.0 kg |

| (e₂) NPK MgCa = 10/-/-/2/15 | |
|---|---|
| chelated trace elements, see above | 8.0 kg |
| calcium nitrate | 556.0 kg |
| urea | 31.0 kg |
| magnesium chloride | 101.0 kg |
| Mg—Al silicate | 15.0 kg |
| glucose syrup | 35.0 kg |
| caseinate | 15.0 kg |
| water | 239.0 kg |
| | 1000.0 kg |

6. Formulations containing pesticides

| (a) NPK = 8/8/6 | |
|---|---|
| chelated trace elements, see above | 4.0 kg |
| diammonium phosphate | 102.0 kg |
| potassium sulfate | 30.0 kg |
| potassium nitrate | 85.0 kg |
| potassium chloride | 9.0 kg |
| urea | 102.0 kg |
| Mg—Al silicate | 8.0 kg |
| glucose syrup | 15.0 kg |
| phosphoric acid 85% | 40.0 kg |
| Dicamba K, Na—salt | 200.0 kg |
| Drysperse | 100.0 kg |
| water | 305.0 kg |
| | 1000.0 kg |

| (b) NPK = 8/8/6 | |
|---|---|
| chelated trace elements, see above | 4.0 kg |
| diammonium phosphate | 102.0 kg |
| potassium sulfate | 30.0 kg |
| potassium nitrate | 85.0 kg |
| potassium chloride | 9.0 kg |
| urea | 102.0 kg |
| Mg—Al silicate | 8.0 kg |
| glucose syrup | 15.0 kg |
| phosphoric acid 85% | 40.0 kg |
| ethyl parathion | 300.0 kg |
| Emcol HJP 1 | 100.0 kg |
| water | 205.0 kg |
| | 1000.0 kg |

| (c) NPK = 8/8/6 | |
|---|---|
| chelated trace elements, see above | 4.0 kg |
| diammonium phosphate | 102.0 kg |
| potassium sulfate | 30.0 kg |
| potassium nitrate | 85.0 kg |
| potassium chloride | 9.0 kg |
| urea | 102.0 kg |
| Mg—Al silicate | 8.0 kg |
| glucose syrup | 15.0 kg |
| phosphoric acid 85% | 40.0 kg |
| Captan | 300.0 kg |
| Drysperse | 100.0 kg |
| water | 205.0 kg |
| | 1000.0 kg |

| (d) NPK = 8/8/6 | |
|---|---|
| chelated trace elements, see above | 4.0 kg |
| diammonium phosphate | 102.0 kg |
| potassium sulfate | 30.0 kg |
| potassium nitrate | 85.0 kg |
| potassium chloride | 9.0 kg |
| urea | 102.0 kg |
| Mg—Al silicate | 8.0 kg |
| caseinate | 7.5 kg |
| glucose syrup | 7.5 kg |
| phosphoric acid 85% | 40.0 kg |
| ethyl parathion | 300.0 kg |
| Emcol HJP 1 | 100.0 kg |
| water | 205.0 kg |
| | 1000.0 kg |

| (e) NPK = 8/8/6 | |
|---|---|
| chelated trace elements, see above | 4.0 kg |
| diammonium phosphate | 102.0 kg |
| potassium sulfate | 30.0 kg |
| potassium nitrate | 85.0 kg |
| potassium chloride | 9.0 kg |
| urea | 102.0 kg |
| Mg—Al silicate | 8.0 kg |
| caseinate | 7.5 kg |
| glucose syrup | 7.5 kg |
| phosphoric acid 85% | 40.0 kg |
| Captan | 300.0 kg |
| Drysperse | 100.0 kg |
| water | 205.0 kg |
| | 1000.0 kg |

| (f) NPK = 8/8/6 | |
|---|---|
| chelated trace elements, see above | 4.0 kg |
| diammonium phosphate | 102.0 kg |
| potassium sulfate | 30.0 kg |
| potassium nitrate | 85.0 kg |
| potassium chloride | 9.0 kg |
| urea | 102.0 kg |
| Mg—Al silicate | 8.0 kg |
| caseinate | 7.5 kg |
| glucose syrup | 7.5 kg |
| phosphoric acid 85% | 40.0 kg |
| Dicamba K, sodium salt | 200.0 kg |
| Drysperse | 100.0 kg |
| water | 305.0 kg |
| | 1000.0 kg |

7. Formulation containing sorbitol and sodium polyphosphate

| NPK = 20/4/8 | |
|---|---|
| chelated trace elements, see above | 8.0 kg |
| potassium sulfate | 94.0 kg |
| potassium nitrate | 73.0 kg |
| urea | 333.0 kg |
| ammonium nitrate | 119.0 kg |
| Na—polyphosphate | 59.0 kg |
| Mg—Al silicate | 15.0 kg |
| sorbite | 25.0 kg |
| water | 274.0 kg |
| | 1000.0 kg |

8. Formulation containing polyvinyl alcohol and sodium polyphosphate

| NPK = 20/4/8 | |
|---|---|
| chelated trace elements, see above | 8.0 kg |
| potassium sulfate | 94.0 kg |
| potassium nitrate | 73.0 kg |
| urea | 333.0 kg |
| ammonium nitrate | 119.0 kg |
| Na—polyphosphate | 59.0 kg |
| Mg—Al silicate | 15.0 kg |
| polyvinyl alcohol | 30.0 kg |
| water | 269.0 kg |
| | 1000.0 kg |

9. Formulations containing lignin sulfonic acid and sodium polyphosphate

| NPK = 20/4/8 | |
|---|---|
| chelated trace elements, see above | 8.0 kg |
| potassium sulfate | 94.0 kg |
| potassium nitrate | 73.0 kg |
| urea | 333.0 kg |
| ammonium nitrate | 119.0 kg |
| Na—polyphosphate | 59.0 kg |
| Mg—Al silicate | 16.0 kg |
| lignin sulfonic acid | 60.0 kg |
| water | 239.0 kg |
| | 1000.0 kg |

10. Formulation containing caseinate and sodium polyphosphate

| NPK = 20/4/8 | |
|---|---|
| chelated trace elements, see above | 8.0 kg |
| potassium sulfate | 94.0 kg |
| potassium nitrate | 73.0 kg |
| urea | 333.0 kg |
| ammonium nitrate | 119.0 kg |
| Na—polyphosphate | 59.0 kg |
| Mg—Al silicate | 15.0 kg |
| caseinate | 30.0 kg |

| | |
|---|---:|
| water | 269.0 kg |
| | 1000.0 kg |

11. Formulations containing caseinate and glucose syrup

($a_1$) NPK = 16/16/12

| | |
|---|---:|
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| glucose syrup | 35.0 kg |
| caseinate | 15.0 kg |
| phosphoric acid 85% | 80.0 kg |
| water | 198.0 kg |
| | 1000.0 kg |

($a_2$) NPK = 16/16/12

| | |
|---|---:|
| chelated trace elements, see above | 8.0 kg |
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| glucose syrup | 35.0 kg |
| caseinate | 15.0 kg |
| phosphoric acid 85% | 80.0 kg |
| water | 190.0 kg |
| | 1000.0 kg |

($b_1$) NPK = 10/-/20

| | |
|---|---:|
| caustic potash 45% | 140.0 kg |
| potassium sulfate | 299.0 kg |
| ammonium nitrate | 26.0 kg |
| urea | 201.0 kg |
| ammonium sulfate | 5.0 kg |
| Mg—Al silicate | 15.0 kg |
| glucose syrup | 35.0 kg |
| caseinate | 15.0 kg |
| water | 264.0 kg |
| | 1000.0 kg |

($b_2$) NPK = 10/-/20

| | |
|---|---:|
| chelated trace elements, see above | 8.0 kg |
| caustic potash 45% | 140.0 kg |
| potassium sulfate | 199.0 kg |
| ammonium nitrate | 26.0 kg |
| urea | 201.0 kg |
| ammonium sulfate | 5.0 kg |
| Mg—Al silicate | 15.0 kg |
| glucose syrup | 35.0 kg |
| caseinate | 15.0 kg |
| water | 256.0 kg |
| | 1000.0 kg |

($c_1$) NPK = 25/6/10

| | |
|---|---:|
| diammonium phosphate | 77.0 kg |
| phosphoric acid 85% | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al silicate | 15.0 kg |
| glucose syrup | 35.0 kg |
| caseinate | 15.0 kg |
| water | 87.0 kg |
| | 1000.0 kg |

($c_2$) NPK = 25/6/10

| | |
|---|---:|
| chelated trace elements, see above | 8.0 kg |
| diammonium phosphate | 77.0 kg |
| phosphoric acid 85% | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al silicate | 15.0 kg |
| glucose syrup | 35.0 kg |
| caseinate | 15.0 kg |
| water | 79.0 kg |
| | 1000.0 kg |

($d_1$) NPK = 20/-/15

| | |
|---|---:|
| ammonium nitrate | 87.0 kg |
| potassium nitrate | 327.0 kg |
| urea | 222.0 kg |
| Mg—Al silicate | 15.0 kg |
| glucose syrup | 35.0 kg |
| caseinate | 15.0 kg |
| water | 299.0 kg |
| | 1000.0 kg |

($d_2$) NPK = 20/-/15

| | |
|---|---:|
| chelated trace elements, see above | 8.0 kg |
| ammonium nitrate | 87.0 kg |
| potassium nitrate | 327.0 kg |
| urea | 222.0 kg |
| Mg—Al silicate | 15.0 kg |
| glucose syrup | 35.0 kg |
| caseinate | 15.0 kg |
| water | 291.0 kg |
| | 1000.0 kg |

($e_1$) NPK MgCa = 10/-/-/2/15

| | |
|---|---:|
| calcium nitrate | 556.0 kg |
| urea | 31.0 kg |
| magnesium chloride | 101.0 kg |
| Mg—Al silicate | 15.0 kg |
| glucose syrup | 35.0 kg |
| caseinate | 15.0 kg |
| water | 247.0 kg |
| | 1000.0 kg |

($e_2$) NPK MgCa = 10/-/-/2/15

| | |
|---|---:|
| chelated trace elements, see above | 8.0 kg |
| calcium nitrate | 556.0 kg |
| urea | 31.0 kg |
| magnesium chloride | 101.0 kg |
| Mg—Al silicate | 15.0 kg |
| glucose syrup | 35.0 kg |
| caseinate | 15.0 kg |
| water | 239.0 kg |
| | 1000.0 kg |

(12). Formulations containing glucose syrup and sodium polyphosphate

($a_1$) NPK = 16/16/12

| | |
|---|---:|
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| glucose syrup | 35.0 kg |
| Na—polyphosphate | 15.0 kg |
| phosphoric acid 85% | 80.0 kg |
| water | 198.0 kg |
| | 1000.0 kg |

($a_2$) NPK = 16/16/12

| | |
|---|---:|
| chelated trace elements, see above | 8.0 kg |
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| glucose syrup | 35.0 kg |
| Na—polyphosphate | 15.0 kg |
| phosphoric acid 85% | 80.0 kg |
| water | 190.0 kg |
| | 1000.0 kg |

($b_1$) NPK = 20/4/8

| | |
|---|---:|
| potassium sulfate | 94.0 kg |
| potassium nitrate | 73.0 kg |
| urea | 333.0 kg |
| ammonium nitrate | 119.0 kg |
| Na—polyphosphate | 59.0 kg |
| Mg—Al silicate | 15.0 kg |
| glucose syrup | 35.0 kg |
| water | 272.0 kg |
| | 1000.0 kg |

($b_2$) NPK = 20/4/8

| | |
|---|---:|
| chelated trace elements, see above | 8.0 kg |
| potassium sulfate | 94.0 kg |

-continued

| | |
|---|---|
| potassium nitrate | 73.0 kg |
| urea | 333.0 kg |
| ammonium nitrate | 119.0 kg |
| Na—polyphosphate | 59.0 kg |
| Mg—Al silicate | 15.0 kg |
| glucose syrup | 35.0 kg |
| water | 264.0 kg |
| | 1000.0 kg |

(c₁) NPK = 10/-/20

| | |
|---|---|
| caustic potash 45% | 140.0 kg |
| potassium sulfate | 299.0 kg |
| ammonium nitrate | 26.0 kg |
| urea | 201.0 kg |
| ammonium sulfate | 5.0 kg |
| Mg—Al silicate | 15.0 kg |
| glucose syrup | 35.0 kg |
| Na—polyphosphate | 15.0 kg |
| water | 264.0 kg |
| | 1000.0 kg |

(c₂) NPK = 10/-/20

| | |
|---|---|
| chelated trace elements, see above | 8.0 kg |
| caustic potash 45% | 140.0 kg |
| potassium sulfate | 299.0 kg |
| ammonium nitrate | 26.0 kg |
| urea | 201.0 kg |
| ammonium sulfate | 5.0 kg |
| Mg—Al silicate | 15.0 kg |
| glucose syrup | 35.0 kg |
| Na—polyphosphate | 15.0 kg |
| water | 256.0 kg |
| | 1000.0 kg |

(d₁) NPK = 15/6/10

| | |
|---|---|
| diammoniumphosphate | 77.0 kg |
| phosphoric acid 85% | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al silicate | 15.0 kg |
| glucose syrup | 35.0 kg |
| Na—polyphosphate | 15.0 kg |
| water | 87.0 kg |
| | 1000.0 kg |

(d₂) NPK = 25/6/10

| | |
|---|---|
| chelated trace elements, see above | 8.0 kg |
| diammonium phosphate | 77.0 kg |
| phosphoric acid 85% | 31.0 kg |
| potassium sulfate | 27.0 kg |
| potassium nitrate | 172.0 kg |
| potassium chloride | 13.0 kg |
| ammonium nitrate | 300.0 kg |
| urea | 228.0 kg |
| Mg—Al silicate | 15.0 kg |
| glucose syrup | 35.0 kg |
| Na—polyphosphate | 15.0 kg |
| water | 79.0 kg |
| | 1000.0 kg |

(e₁) NPK = 20/-/15

| | |
|---|---|
| ammonium nitrate | 87.0 kg |
| potassium nitrate | 327.0 kg |
| urea | 222.0 kg |
| Mg—Al silicate | 15.0 kg |
| glucose syrup | 35.0 kg |
| Na—polyphosphate | 15.0 kg |
| water | 299.0 kg |
| | 1000.0 kg |

(e₂) NPK = 20/-/15

| | |
|---|---|
| chelated trace elements, see above | 8.0 kg |
| ammonium nitrate | 87.0 kg |
| potassium nitrate | 327.0 kg |
| urea | 222.0 kg |
| Mg—Al silicate | 15.0 kg |
| glucose syrup | 35.0 kg |
| Na—polyphosphate | 15.0 kg |
| water | 291.0 kg |
| | 1000.0 kg |

(f₁) NPK MgCa = 10/-/-/2/15

| | |
|---|---|
| calcium nitrate | 556.0 kg |

-continued

| | |
|---|---|
| urea | 31.0 kg |
| Mg chloride | 101.0 kg |
| Mg—Al silicate | 15.0 kg |
| glucose syrup | 35.0 kg |
| Na—polyphosphate | 15.0 kg |
| water | 247.0 kg |
| | 1000.0 kg |

(f₂) NPK MgCa 10/-/-/2/15

| | |
|---|---|
| chelated trace elements, see above | 8.0 kg |
| calcium nitrate | 556.0 kg |
| urea | 31.0 kg |
| magnesium chloride | 101.0 kg |
| Mg—Al silicate | 15.0 kg |
| glucose syrup | 35.0 kg |
| Na—polyphosphate | 15.0 kg |
| water | 239.0 kg |
| | 1000.0 kg |

13. Formulations containing caseinate, glucose syrup and sodium polyphosphate (a) NPK = 20/4/8

| | |
|---|---|
| potassium sulfate | 94.0 kg |
| potassium nitrate | 73.0 kg |
| urea | 333.0 kg |
| ammonium nitrate | 119.0 kg |
| Na—polyphosphate | 59.0 kg |
| Mg—Al silicate | 15.0 kg |
| glucose syrup | 35.0 kg |
| caseinate | 15.0 kg |
| water | 257.0 kg |
| | 1000.0 kg |

(b) NPK = 20/4/8

| | |
|---|---|
| chelated trace elements, see above | 8.0 kg |
| potassium sulfate | 94.0 kg |
| potassium nitrate | 73.0 kg |
| urea | 333.0 kg |
| ammonium nitrate | 119.0 kg |
| Na—polyphosphate | 59.0 kg |
| Mg—Al silicate | 15.0 kg |
| glucose syrup | 35.0 kg |
| caseinate | 15.0 kg |
| water | 249.0 kg |
| | 1000.0 kg |

14. Formulations containing lignin sulfonic acid (a) NPK = 16/16/12

| | |
|---|---|
| chelated trace elements, see above | 8.0 kg |
| diammonium phosphate | 205.0 kg |
| potassium sulfate | 60.0 kg |
| potassium nitrate | 170.0 kg |
| potassium chloride | 19.0 kg |
| urea | 203.0 kg |
| Mg—Al silicate | 15.0 kg |
| glucose syrup | 30.0 kg |
| ligninsulfonic acid | 30.0 kg |
| phosphoric acid 85% | 80.0 kg |
| water | 180.0 kg |
| | 1000.0 kg |

(b) NPK = 10/-/20

| | |
|---|---|
| chelated trace elements, see above | 8.0 kg |
| caustic potash 45% | 140.0 kg |
| potassium sulfate | 299.0 kg |
| ammonium nitrate | 26.0 kg |
| urea | 201.0 kg |
| ammonium sulfate | 5.0 kg |
| Mg—Al silicate | 15.0 kg |
| glucose syrup | 30.0 kg |
| ligninsulfonic acid | 30.0 kg |
| water | 246.0 kg |
| | 1000.0 kg |

(c) NPK = 25/6/10

| | |
|---|---|
| chelated trace elements, see above | 8.0 kg |
| diammonium phosphate | 77.0 kg |
| phosphoric acid 45% | 31.0 kg |
| potassium sulfate | 27.0 kg |
| potassium nitrate | 172.0 kg |
| potassium chloride | 13.0 kg |
| ammonium nitrate | 300.0 kg |
| urea | 218.0 kg |
| Mg—Al silicate | 15.0 kg |
| glucose syrup | 30.0 kg |

-continued

| | |
|---|---|
| ligninsulfonic acid | 30.0 kg |
| water | 69.0 kg |
| | 1000.0 kg |

(d) NPK MgCa = 10/-/-/2/15

| | |
|---|---|
| chelated trace elements, see above | 8.0 kg |
| calcium nitrate | 556.0 kg |
| urea | 31.0 kg |
| magnesium chloride | 101.0 kg |
| Mg—Al silicate | 15.0 kg |
| glucose syrup | 30.0 kg |
| ligninsulfonic acid | 30.0 kg |
| water | 229.0 kg |
| | 1000.0 kg |

(e) NPK = 20/-/15

| | |
|---|---|
| chelated trace elements, see above | 8.0 kg |
| ammonium nitrate | 87.0 kg |
| potassium nitrate | 327.0 kg |
| urea | 222.0 kg |
| Mg—Al silicate | 15.0 kg |
| glucose syrup | 30.0 kg |
| ligninsulfonic acid | 30.0 kg |
| water | 281.0 kg |
| | 1000.0 kg |

(f) NPK = 8/8/6

| | |
|---|---|
| chelated trace elements, see above | 4.0 kg |
| diammonium phosphate | 102.0 kg |
| potassium sulfate | 30.0 kg |
| potassium nitrate | 85.0 kg |
| potassium chloride | 9.0 kg |
| urea | 102.0 kg |
| Mg—Al silicate | 8.0 kg |
| ligninsulfonic acid | 7.5 kg |
| glucose syrup | 7.5 kg |
| phosphoric acid | 40.0 kg |
| ethyl parathion | 300.0 kg |
| Emcol HJP 1 | 100.0 kg |
| water | 205.0 kg |
| | 1000.0 kg |

(g) NPK = 8/8/6

| | |
|---|---|
| chelated trace elements, see above | 4.0 kg |
| diammonium phosphate | 102.0 kg |
| potassium sulfate | 30.0 kg |
| potassium nitrate | 85.0 kg |
| potassium chloride | 9.0 kg |
| urea | 102.0 kg |
| Mg—Al silicate | 8.0 kg |
| ligninsulfonic acid | 7.5 kg |
| glucose syrup | 7.5 kg |
| phosphoric acid 85% | 40.0 kg |
| Dicamba K, Na—salt | 200.0 kg |
| Drysperse | 100.0 kg |
| water | 305.0 kg |
| | 1000.0 kg |

(h) NPK = 8/8/6

| | |
|---|---|
| chelated trace elements, see above | 4.0 kg |
| diammonium phosphate | 102.0 kg |
| potassium sulfate | 30.0 kg |
| potassium nitrate | 85.0 kg |
| potassium chloride | 9.0 kg |
| urea | 102.0 kg |
| Mg—Al silicate | 8.0 kg |
| ligninsulfonic acid | 7.5 kg |
| glucose syrup | 7.5 kg |
| phosphoric acid 85% | 40.0 kg |
| Captan | 300.0 kg |
| Drysperse | 100.0 kg |
| water | 205.0 kg |
| | 1000.0 kg |

15. Formulation containing glucose syrup, sodium polyphosphate and ligninsulfonic acid

NPK = 20/4/8

| | |
|---|---|
| chelated trace elements, see above | 8.0 kg |
| potassium sulfate | 94.0 kg |
| potassium nitrate | 73.0 kg |
| urea | 333.0 kg |
| ammonium nitrate | 119.0 kg |
| Na—polyphosphate | 59.0 kg |
| Mg—Al silicate | 15.0 kg |
| glucose syrup | 30.0 kg |
| ligninsulfonic acid | 30.0 kg |
| water | 239.0 kg |
| | 1000.0 kg |

The storage stability of the fertilizer according to the invention will be seen from the following Tables; the Tables 9 and 10 are given for comparison. However, the other Tables also partly contain measurements of comparison suspensions.

TABLE 1

Stability of the suspension fertilizer 16/16/12 measured in ml of the settling volume*

| dispersing agent | settling time expressed in hours | | | | | | |
|---|---|---|---|---|---|---|---|
| | 0 | 4 | 8 | 12 | 16 | 20 | 24 |
| none | 500 | 100 | 90 | 90 | 90 | 90 | 90 |
| Mg—Al silicates | 500 | 480 | 460 | 450 | 440 | 430 | 430 |
| Mg—Al silicates + sorbitol | 500 | 500 | 500 | 498 | 498 | 497 | 497 |
| Mg—Al silicates + polyvinyl alcohol | 500 | 500 | 495 | 490 | 480 | 475 | 473 |
| Mg—Al silicates + ligninsulfonic acids | 500 | 500 | 500 | 500 | 498 | 495 | 495 |
| Mg—Al silicates + caseinate | 500 | 490 | 480 | 475 | 473 | 470 | 470 |
| Mg—Al silicates + glucose syrup | 500 | 500 | 500 | 498 | 498 | 497 | 497 |
| Mg—Al silicates + Na—polyphosphate | 500 | 500 | 500 | 500 | 498 | 498 | 498 |
| Mg—Al silicates + caseinate + glucose syrup | 500 | 500 | 500 | 500 | 500 | 500 | 500 |
| Mg—Al silicates + glucose syrup + Na—polyphosphate | 500 | 500 | 500 | 500 | 500 | 500 | 500 |

*Settling volume: distribution volume of the solid phase in liquid.

TABLE 2

Crystal size distribution (%) of a suspension fertilizer 16/16/12 containing Mg—Al silicate + sorbitol

| Year | Time of the analysis | >1 mm | 0.6–1 mm | 0.43–0.6 mm | 0.3–0.43 mm | <0.3 mm |
|---|---|---|---|---|---|---|
| 1970 | June | — | 1.0 | 4.0 | 24.0 | 71.0 |
| | September | — | 0.9 | 4.7 | 24.5 | 69.9 |
| | December | — | 1.3 | 5.6 | 24.5 | 68.6 |
| 1971 | March | 0.10 | 1.8 | 5.4 | 25.6 | 67.2 |
| | June | 0.10 | 1.8 | 6.1 | 26.4 | 65.7 |
| | September | 0.10 | 1.9 | 6.7 | 26.9 | 64.5 |
| | December | 0.15 | 2.4 | 7.3 | 27.1 | 63.2 |
| 1972 | March | 0.10 | 2.3 | 7.3 | 27.9 | 62.5 |
| | June | 0.10 | 2.7 | 8.0 | 28.5 | 60.8 |
| | September | 0.25 | 3.1 | 8.4 | 28.7 | 59.8 |
| | December | 0.25 | 3.5 | 8.9 | 29.8 | 57.8 |

TABLE 3

Crystal size distribution (%) of a suspension fertilizer 16/16/12 containing Mg—Al silicate + polyvinyl alcohol

| Year | Time of the analysis | >1 mm | 0.6–1 mm | 0.43–0.6 mm | 0.3–0.43 mm | <0.3 mm |
|---|---|---|---|---|---|---|
| 1970 | June | — | 1.2 | 4.9 | 20.1 | 73.8 |
| | September | — | 1.2 | 5.0 | 20.0 | 73.8 |
| | December | — | 1.1 | 5.0 | 19.5 | 74.4 |
| 1971 | March | — | 1.6 | 5.9 | 21.0 | 71.5 |
| | June | 0.07 | 2.4 | 6.1 | 22.4 | 69.1 |
| | September | 0.07 | 2.5 | 6.0 | 22.7 | 68.8 |
| | December | 0.08 | 2.4 | 6.1 | 23.0 | 68.5 |
| 1972 | March | 0.08 | 2.9 | 6.9 | 23.9 | 66.3 |
| | June | 0.08 | 2.6 | 7.5 | 24.5 | 65.4 |
| | September | 0.10 | 2.9 | 7.4 | 25.0 | 64.7 |

TABLE 3-continued

Crystal size distribution (%) of a suspension fertilizer 16/16/12 containing Mg—Al silicate + polyvinyl alcohol

| Year | Time of the analysis | >1 mm | 0.6–1 mm | 0.43–0.6 mm | 0.3–0.43 mm | <0.3 mm |
|---|---|---|---|---|---|---|
| | December | 0.10 | 3.2 | 8.0 | 26.3 | 62.5 |

TABLE 4

Crystal size distribution (%) of a suspension fertilizer 16/16/12 containing Mg—Al silicate and ligninsulfonic acids

| Year | Time of the analysis | >1 mm | 0.6–1 mm | 0.43–0.6 mm | 0.3–0.43 mm | <0.3 mm |
|---|---|---|---|---|---|---|
| 1970 | June | — | 1.0 | 5.0 | 20.0 | 74.0 |
| | September | — | 1.0 | 5.0 | 20.2 | 73.8 |
| | December | — | 1.3 | 5.1 | 21.0 | 72.6 |
| 1971 | March | — | 1.3 | 5.5 | 22.0 | 71.2 |
| | June | 0.04 | 1.5 | 5.9 | 21.9 | 70.7 |
| | September | 0.04 | 1.7 | 6.2 | 21.9 | 70.2 |
| | December | 0.05 | 1.9 | 6.5 | 23.5 | 68.1 |
| 1972 | March | 0.05 | 2.2 | 6.9 | 23.9 | 67.0 |
| | June | 0.07 | 2.4 | 7.2 | 24.3 | 66.1 |
| | September | 0.07 | 2.5 | 7.7 | 26.1 | 63.7 |
| | December | 0.10 | 2.7 | 8.0 | 27.2 | 62.1 |

TABLE 5

Crystal size distribution (%) of a suspension fertilizer 16/16/12 containing Mg—Al silicate + caseinate

| Year | Time of the analysis | >1 mm | 0.6–1 mm | 0.43–0.6 mm | 0.3–0.43 mm | <0.3 mm |
|---|---|---|---|---|---|---|
| 1970 | June | — | 0.8 | 2.7 | 20.5 | 76.0 |
| | September | — | 0.8 | 3.2 | 21.0 | 75.0 |
| | December | — | 1.0 | 3.0 | 22.0 | 74.0 |
| 1971 | March | — | 1.0 | 3.5 | 22.0 | 73.4 |
| | June | 0.05 | 1.4 | 3.9 | 22.7 | 72.0 |
| | September | 0.05 | 1.4 | 4.2 | 23.1 | 71.3 |
| | December | 0.05 | 1.7 | 5.1 | 23.9 | 69.3 |
| 1972 | March | 0.08 | 2.5 | 6.0 | 23.8 | 67.7 |
| | June | 0.08 | 2.7 | 6.0 | 24.0 | 67.3 |
| | September | 0.08 | 2.7 | 7.5 | 25.0 | 64.8 |
| | December | 0.08 | 3.0 | 8.2 | 25.0 | 63.8 |

TABLE 6

Crystal size distribution (%) of a suspension fertilizer 16/16/12 containing Mg—Al silicate + glucose syrup

| Year | Time of the analysis | >1 mm | 0.6–1 mm | 0.43–0.6 mm | 0.3–0.43 mm | <0.3 mm |
|---|---|---|---|---|---|---|
| 1970 | June | — | 0.9 | 5.5 | 20.0 | 73.6 |
| | September | — | 1.2 | 5.9 | 20.4 | 72.5 |
| | December | — | 1.9 | 6.0 | 21.2 | 70.9 |
| 1971 | March | — | 1.7 | 6.5 | 22.0 | 69.8 |
| | June | 0.08 | 2.1 | 7.1 | 22.0 | 68.8 |
| | September | 0.08 | 2.0 | 7.1 | 22.7 | 68.2 |
| | December | 0.13 | 2.5 | 7.5 | 22.5 | 67.5 |
| 1972 | March | 0.14 | 2.3 | 7.5 | 23.0 | 67.1 |
| | June | 0.19 | 2.8 | 8.1 | 24.3 | 64.8 |
| | September | 0.23 | 3.1 | 8.0 | 25.4 | 63.5 |
| | December | 0.25 | 3.5 | 8.2 | 26.0 | 62.3 |

TABLE 7

Crystal size distribution (%) of a suspension fertilizer 16/16/12 containing Mg—Al silicate + caseinate + glucose syrup

| Year | Time of the analysis | >1 mm | 0.6–1 mm | 0.43–0.6 mm | 0.3–0.43 mm | <0.3 mm |
|---|---|---|---|---|---|---|
| 1970 | June | — | 0.7 | 3.2 | 21.0 | 75.1 |
| | September | — | 0.7 | 3.2 | 21.0 | 75.1 |
| | December | — | 0.8 | 4.1 | 22.1 | 73.0 |
| 1971 | March | — | 1.0 | 4.6 | 21.4 | 73.0 |
| | June | 0.03 | 1.4 | 5.0 | 21.4 | 72.2 |
| | September | 0.04 | 1.8 | 5.2 | 22.0 | 71.0 |
| | December | 0.03 | 1.5 | 5.4 | 22.2 | 70.9 |
| 1972 | March | 0.05 | 2.4 | 6.7 | 21.9 | 69.0 |

TABLE 7-continued

Crystal size distribution (%) of a suspension fertilizer 16/16/12 containing Mg—Al silicate + caseinate + glucose syrup

| Year | Time of the analysis | >1 mm | 0.6–1 mm | 0.43–0.6 mm | 0.3–0.43 mm | <0.3 mm |
|---|---|---|---|---|---|---|
| | June | 0.07 | 2.7 | 7.2 | 22.1 | 68.0 |
| | September | 0.07 | 2.7 | 7.2 | 22.0 | 68.1 |
| | December | 0.08 | 3.2 | 8.7 | 22.4 | 65.7 |

TABLE 8

Crystal size distribution (%) of a suspension fertilizer 16/16/12 containing Mg—Al silicate + glucose syrup + Na—polyphosphate

| Year | Time of the analysis | >1 mm | 0.6–1 mm | 0.43–0.6 mm | 0.3–0.43 mm | <0.3 mm |
|---|---|---|---|---|---|---|
| 1972 | January | — | 0.7 | 4.5 | 10.0 | 84.8 |
| | March | — | 0.6 | 4.7 | 10.5 | 84.2 |
| | June | — | 0.8 | 4.5 | 10.7 | 84.0 |
| | September | — | 0.7 | 4.6 | 11.1 | 83.6 |
| | December | — | 0.9 | 5.2 | 11.2 | 82.7 |
| 1973 | March | — | 0.9 | 5.5 | 11.9 | 81.7 |
| | June | — | 1.0 | 5.9 | 12.6 | 80.5 |
| | September | 0.03 | 1.0 | 6.2 | 12.5 | 80.3 |

TABLE 9

Crystal size distribution (%) of a suspension fertilizer composition 16/16/12 containing no dispersing agent

| Time of the analysis | >1 mm | 0.6–1 mm | 0.43–0.6 mm | 0.3–0.43 mm | <0.3 mm |
|---|---|---|---|---|---|
| 0 | — | 2.0 | 3.0 | 20 | 75 |
| 8 | — | 3.0 | 4.0 | 23 | 70 |
| 16 | — | 4.5 | 5.5 | 25 | 65 |
| 24 | 0.5 | 5.0 | 6.0 | 28.5 | 60 |
| 32 | 3.5 | 9.2 | 7.0 | 29.3 | 51 |
| 40 | 12 | 12.5 | 10.0 | 30.2 | 35.3 |
| 48 | 20 | 13 | 11.5 | 31.0 | 24.5 |
| 56 | completely crystallized | | | | |

TABLE 10

Crystal size distribution (%) of a suspension fertilizer 16/16/12 containing Mg—Al silicate but no other dispersing agent

| Time of the analysis | >1 mm | 0.6–1 mm | 0.43–0.6 mm | 0.3–0.43 mm | <0.3 mm |
|---|---|---|---|---|---|
| 0 | — | 1.0 | 5.6 | 19.7 | 73.7 |
| 2 | — | 1.2 | 5.4 | 20.5 | 72.9 |
| 4 | — | 1.3 | 5.7 | 20.9 | 72.1 |
| 6 | 0.5 | 1.3 | 5.9 | 21.0 | 71.3 |
| 8 | 0.7 | 1.5 | 6.2 | 18.4 | 73.2 |
| 10 | 1.0 | 1.7 | 6.9 | 22.5 | 67.9 |
| 12 | 1.4 | 1.9 | 7.0 | 23.0 | 66.7 |
| 14 | 1.9 | 2.5 | 7.5 | 25.7 | 62.4 |
| 16 | 1.9 | 2.9 | 7.5 | 28.4 | 59.3 |
| 18 | 2.1 | 2.7 | 8.4 | 29.2 | 57.6 |

What is claimed is:

1. In a fertilizer of the type which is in the form of a dispersion of undissolved nutrient materials in aqueous medium containing nutrient materials in solution, the dispersion also containing as dispersing agent a hydrated magnesium-aluminum silicate, the improvement for eliminating the necessity for continuous or regular mechanical blending to avoid formation of large crystals and phase separation during prolonged storing up to 2 or 3 years comprising at least one additional dispersing agent, selected from the group consisting of sorbitol in an amount 0.1 to 5%, polyvinyl alcohol in an amount of 0.1 to 5% by weight, a caseinate in an amount of 0.1 to 5% by weight and a soluble starch hydrolysate in an amount of 0.1 to 8% by weight, the total concentration of said additional dispersing agent amounting to from 0.1 to 14% by weight, relative to the finished fertilizer.

2. The improved fertilizer according to claim 1, wherein said additional dispersing agent is sorbitol.

3. The improved fertilizer according to claim 1, wherein said additional dispersing agent is polyvinyl alcohol.

4. The improved fertilizer according to claim 1, wherein said additional dispersing agent is a caseinate selected from the group consisting of alkaline metal caseinates, alkaline earth metal caseinates, and mixtures thereof.

5. The improved fertilizer according to claim 1, wherein the additional dispersing agent is a soluble starch hydrolysate and is glucose syrup.

6. Process of preparing a fertilizer in the form of a concentrated dispersion which comprises introducing sufficient plant nutrients into an aqueous solution of plant nutrients so as to form a dispersion of such nutrients in said aqueous solution, including a magnesium-aluminum silicate as a dispersing agent and additionally introducing at least one additional dispersing agent, selected from the group consisting of sorbitol in an amount 0.1 to 5%, polyvinyl alcohol in an amount of 0.1 to 5% by weight, a caseinate in an amount of 0.1 to 5% by weight, and a soluble starch hydrolysate in an amount of 0.1 to 8% by weight, the total concentration of said additional dispersing agent amounting to from 0.1 to 14% by weight, said percentages by weight being calculated with respect to the finished fertilizer, whereby formation of large crystals and settling of solids in the fertilizer dispersion are inhibited and stabilization over prolonged periods assured.

* * * * *